United States Patent [19]

Doljack

[11] 4,349,883
[45] Sep. 14, 1982

[54] SIGNAL DETECTOR CIRCUIT WITH GAIN CONTROL METHOD

[75] Inventor: Frank A. Doljack, Pleasanton, Calif.

[73] Assignee: The B. F. Goodrich Company, New York, N.Y.

[21] Appl. No.: 126,218

[22] Filed: Mar. 3, 1980

[51] Int. Cl.³ ................ G08B 21/00; G06F 15/46
[52] U.S. Cl. .................... 364/551; 198/502; 198/856; 330/86; 330/144; 340/676
[58] Field of Search ........... 364/468, 478, 550, 551; 340/347 DD, 676; 360/67; 330/86, 144, 282; 198/502, 856

[56] References Cited

U.S. PATENT DOCUMENTS

| | | | |
|---|---|---|---|
| 3,308,392 | 3/1967 | McCarter | 330/144 |
| 3,479,599 | 11/1969 | Molik | 328/146 X |
| 3,609,407 | 9/1971 | Garuts | 307/264 |
| 3,792,459 | 2/1974 | Snyder | 340/676 |
| 3,922,661 | 11/1975 | Enabnit et al. | 198/502 X |
| 3,950,694 | 4/1976 | Maas | 323/16 |
| 3,969,683 | 7/1976 | Fabricius | 330/144 |
| 4,092,719 | 5/1978 | Salmon | 364/468 |
| 4,109,213 | 8/1978 | Holley et al. | 330/86 X |
| 4,132,957 | 1/1979 | Hekimian et al. | 330/86 X |
| 4,229,735 | 10/1980 | Houck | 340/676 |

Primary Examiner—Jerry Smith
Attorney, Agent, or Firm—Maky, Renner, Otto & Boisselle

[57] ABSTRACT

A signal control apparatus controls the gain of an amplifier in a proportional stepwise manner to produce in response to an input signal an output signal having a magnitude of relatively accurately controlled value. The amplifier gain is controlled in steps that are proportional to a parameter, such as the magnitude of the output signal itself, thereby providing an automatic gain control function. A method also is disclosed for effecting such signal control. Moreover, such apparatus and method are employed in a system and method for monitoring the occurrence of plural events in a cyclical process, such as the travel of a conveyor belt, the system, then, preferably being a conveyor belt rip detector system.

40 Claims, 5 Drawing Figures

SIGNAL DETECTOR CIRCUIT WITH GAIN CONTROL METHOD

TECHNICAL FIELD

The present invention relates to signal control apparatus and method and particularly to such apparatus and method employed for automatic gain control purposes. Moreover, the invention relates to a monitor system and method for detecting whether successive events occur at their proper positions in a process and is particularly directed to a monitor system for a rip detector for conveyor belts and the like.

BACKGROUND

In large endless non-metallic conveyor belts used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a plate where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activates an alarm and/or deactivates the conveyor belt drive.

A number of improvements for use in conveyor belt rip detectors are disclosed in co-pending U.S. patent application Ser. No. 960,424, filed Nov. 13, 1978, for "Monitor System System and Method for Detecting Sequential Events in a Cyclical Process", now U.S. Pat. No. 4,228,513, issued Oct. 14, 1980, and assigned to the same assignee as the present application. One of such improvements includes a means for detecting the progress of the conveyor belt to know when an antenna should be at the rip detector station. If there is no antenna present then, a prompt shut-down of the conveyor belt drive may be effected.

The disclosure of U.S. patent application Ser. No. 960,424, now U.S. Pat. No. 4,228,813, is hereby incorporated by reference.

Wear, stretching, contraction, dirt, other environmental conditions, etc. may cause a variation in the efficiency of signal coupling, whether of the capacitive, inductive, optical, or any other type of coupling, between the antennas (or other signal coupling means carried by the belt) and the transmitter and the receiver at a rip detector station. Such efficiency variation will vary the magnitude or other parameter of the input signal delivered from the receiver to the detector, which may detrimentally affect operation of the entire system.

Thus, it would be desirable to provide signal information to the detector at a relatively accurately controlled magnitude (or other parameter).

The system disclosed in application Ser. No. 960,424, now U.S. Pat. No. 4,228,513, operates in response to digital monitoring and control. Accordingly, it would be desirable to provide the aforesaid control, i.e. preferably gain control, function digitally.

Moreover, many prior signal control, i.e. preferably automatic gain control, circuits and the like have operated in a manner that provides a gradual signal variation in an analog fashion or in steps of equal increments, which may reduce the time efficiency of the control function.

Accordingly, it would be desirable to improve the time efficiency of the control function, such as an automatic gain control function.

SUMMARY OF THE INVENTION

In accordance with one aspect of the invention, a signal control apparatus comprises input means for receiving an input signal, output means for producing an output signal, changing means for receiving such input signal and causing said output neons to produce such output signal at a predetermined magnitude in response to receipt of such input signal, and control means for controlling the changing means proportionally stepwise is response to the magnitude of at least one of such input and output signals.

According to another aspect, a monitoring system for monitoring the occurrence of a plurality of events in a cyclical process includes an event transducer for detecting the occurrence of such events in such process and producing an input signal upon the occurrence of each event, an output means for producing an output signal, changing means for receiving such input signal and causing said output means to produce such output signal at a predetermined magnitude in response to receipt of such input signal, and control means for controlling the changing means proportionally stepwise in response to the magnitude of at least one of such input and output signals, a progress transducer for detecting the progress of the process, and a search means for sensing whether respective events occur at expected positions in the progress of the process.

According to an additional aspect, a monitoring system for monitoring the occurrence of a plurality of events in a cyclical process includes an event transducer for detecting the occurrence of such events and producing an input signal upon the occurrence of each, output means for producing an output signal, changing means for receiving such input signal and causing said output means to produce such output signal at a predetermined magnitude in response to receipt of such input signal, and control means for controlling said changing means proportionally stepwise in response to the magnitude of at least one of such input and output signals, a progress transducer for detecting the progress of the process, a control means for starting and stopping the process, and a computer for sensing whether respective events occur at expected positions in the progress of the process, the computer being coupled to the control means to operate the same to stop the process when a prescribed number of events have been missed.

According to a further aspect of the invention, a method for controlling a signal includes providing an input signal, amplifying the input signal to produce an output signal at a predetermined magnitude, and controlling the amplifying step proportionally stepwise in response to the magnitude of at least one of such input and output signals.

According to still another aspect of the invention, a method for automatically monitoring the occurrence of a plurality of events in a cyclical process includes storing information concerning the expected position of each event in the process, detecting the occurrence of such events in the process and producing an input signal upon such occurrence, amplifying the input signal to produce an output signal at a predetermined magnitude, controlling the amplifying step proportionally stepwise in response to the magnitude of at least one of the input and output signals, simultaneously detecting the progress of the process, and sensing whether respective events occur at expected positions in the progress of the process.

In accordance with the preferred embodiment and best mode of the present invention, the foregoing aspects and features of the invention are employed in connection with a conveyor belt rip detector system, whereby the input signal is from the receiver of a rip detector system, the process is the movement by the conveyor belt as it is driven along, and the cyclical events are the periodic passing of antennas or other detectable means past a rip detector station.

With the foregoing in mind, it is a primary object of the invention to provide a signal control apparatus and method that are improved in the noted respects.

Another primary object is to provide improvements for a monitor system and method and especially for such a system and method used in connection with conveyor belt equipment for detecting rips in the belt.

An additional object is to provide an automatic gain control circuit and method and especially to provide the same for use with such monitor systems and methods.

A further object is to provide a digital control apparatus and method and particularly to provide the same for automatic gain control purposes.

Still another object is to control the relation between an input and an output signal in a proportional stepwise manner in response to the magnitude or other parameter of at least one of the input and output signals.

Still an additional object is to display the effective magnitude of a signal, particularly that used in a conveyor belt rip detector system.

Still a further object of the present invention is to improve the accuracy and efficiency of operation of a monitor system and method, especially such used in connection with the detection of rips in a conveyor belt.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of various ways in which the principles of the invention may be employed.

BRIEF DESCRIPTION OF THE DRAWINGS

In the annexed drawings:

FIG. 3 is a schematic electric circuit diagram of a signal control circuit apparatus in accordance with the present invention operated under control of the computer illustrated in FIG. 1, for example;

DETAILED DESCRIPTION OF INVENTION

The following description of the preferred embodiment and best mode of the present invention will be described in connection with a conveyor belt system in which the monitor system is used as a conveyor belt rip detector system and the signal control apparatus or circuit is used in such rip detector system. It will be appreciated, however, that the monitor system may be used in connection with other systems for monitoring cyclical events and the signal control apparatus or ciruit may be used also in other systems.

Figure 1:
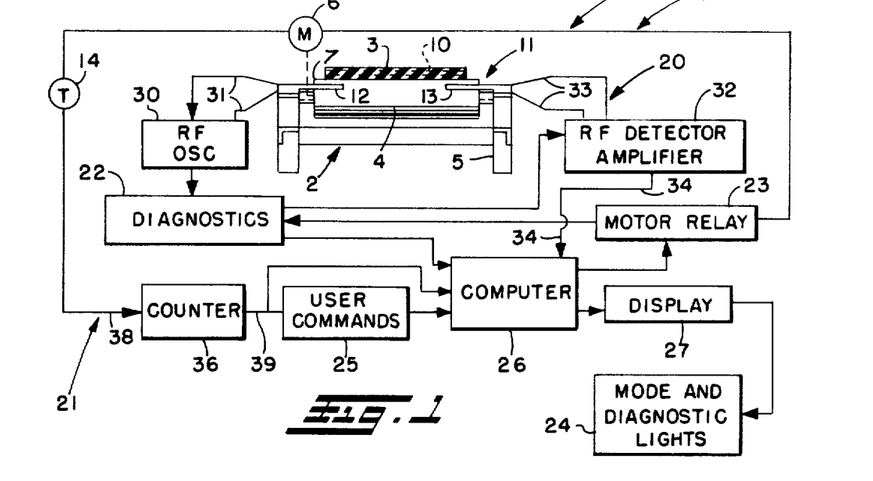
FIG. 1 is a schematic system diagram of a conveyor belt system with which the conveyor belt rip detector monitor system including the signal control apparatus of the invention may be used.
Figure 2:
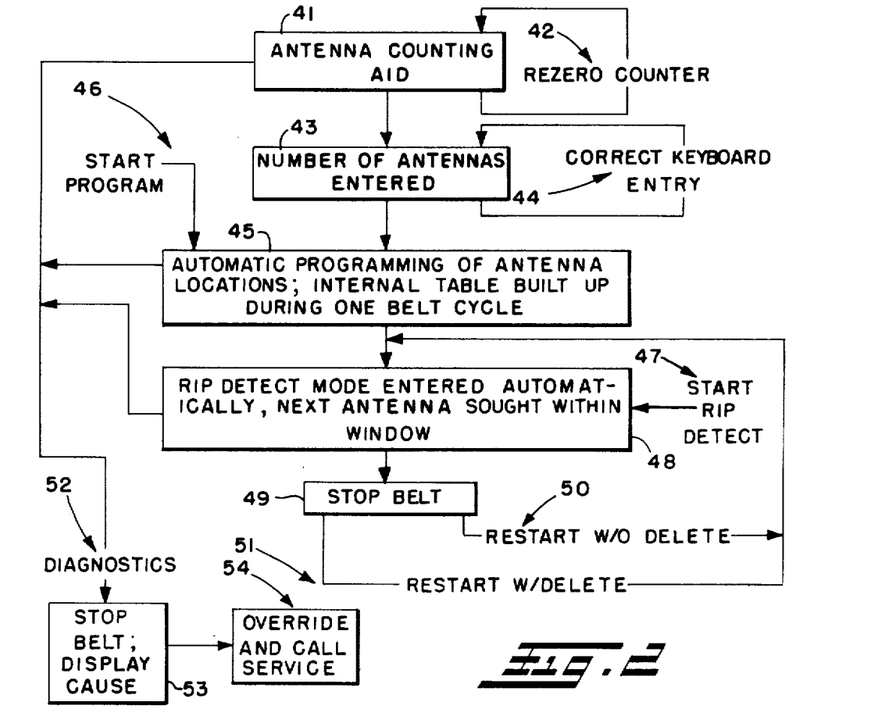
FIG. 2 is a flow chart diagram illustrating the several operating modes of the monitor system.

Referring now in detail to the drawings, and initially to FIGS. 1 and 2, which correspond to FIGS. 3 and 4 of U.S. patent application Ser. No. 950,424, now U.S. Pat. No. 4,228,513, a monitor system generally indicated at 1 is shown in association with a conveyor belt system 2 for detecting a rip, tear, or other similar flaw (hereinafter collectively "rip") in the conveyor belt 3. The belt 3, which may be a conventional endless, non-metallic conveyor belt, is supported by rollers 4 at longitudinal stations along a support frame 5 and is driven by a motor 6 which turns a drive roller.

The transducer technique for observing the structural integrity, or lack of the same, e.g. a rip, of the belt 3 uses a plurality of antennas 10 embedded in or otherwise carried by the belt generally transversely to the travel direction thereof and at a rip detector station 11 a transmitter plate 12 and a receiver or detector plate 13. Each antenna 10 preferably is a single electical conductor of relatively small gauge, or other type of electrical conductor, intended, when passing the station 11, capacitively to couple with the transmitter and receiver plates 12, 13 to couple an electrical signal therebetween. (It will be appreciated that other types of signal coupling may be employed by the antennas or other means carried by the belt.) Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

The efficiency of such signal coupling at the rip detector station may be affected by wear of an antenna, a transmitter or receiver plate, or the belt itself, by stretching or contraction of the belt, by accumulated dirt, by other means causing a change in the distance between any antenna and the transmiter and receiver plates, etc., thus causing, for example, a change in the magnitude of the signal ultimately received by the receiver plate and delivered as an input signal to the downstream circuitry associated therewith. A principal function of the signal control apparatus and method of the invention is to refine such input signal in an efficient manner so that the signal delivered to the downstream circuitry usually is of a predetermined magnitude. As used herein "predetermined magnitude" may mean an exact magnitude or a range of magnitudes that are at a satisfactory level of value.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process, for example by monitoring the rotation or output of the motor 6 or rotation of the drive roller with a conventional tachometer 14, and correlates such progress information with the detected event information to sense promptly when an event has been missed. Upon missing an event, the monitor system 1 may promptly stop the motor 6 to shut down the conveyor belt system 2 minimizing any rip damage to the belt 3.

The fundamental components of the monitor system 1 include an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 at the rip detector station 11 in proximity to the belt 3 capacitive coupling to and through an antenna 10. The detector 20 includes an oscillator 30, which produces an AC electrical signal, preferably in the radio frequency range, for example, on the order of about 200 KHz, delivered by an electrical connection 31 to the transmitter plate 12; and a detector amplifier 32 coupled to the receiver plate 13. When an antenna 10 passes in proximity to the transmitter plate 12 such AC signal is capacitively coupled to the antenna. Moreover, assuming such antenna is whole, i.e. in particular there is no rip in the belt 3 at that location, such signal will be capacitively coupled from the antenna to the receiver plate 13 for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26. Thus, the event signal is an input signal to the detector amplifier 32 and the event detect signal is an output signal therefrom.

The signal control apparatus of the invention is an improvement in such detector amplifier with a control provided therefor by the computer 26.

Progress of the belt movement is detected by the progress detector 21, which may include a progress transducer in the form of a tachometer 14 and a counter 36. The tachometer 14 is connected to the conveyor belt drive motor 6 or drive roller 7 and produces in conventional manner a series of train of electrical pulses on line 38. The frequency of such pulse train preferably is directly proportional to the rotational speed of the motor 6 and, accordingly, directly proportionally represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progess signal on bus 39. When the next event detect signal is received, the computer 26 again reads and stores the progress signal on the bus 39. The value of the difference between the two progress signals, then, represents the distance between the two adjacent antennas 10 that passes the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate in a rip detect mode. More particularly, in the rip detect mode the computer 26 compares the progress signal on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26 accordingly, the computer 26 promptly declares the event missing and operates the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. Operation of the relay 23 by the computer 26, then, determines whether or not the conveyor belt 3 will move. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system.

The several operating modes for the monitor system 1 are depicted in a functional block diagram in FIG. 2. The monitor system 1 may be used as a counting aid for antennas or other events detected by the monitor system, block 41. This function is particularly useful when the antennas are embedded in a conveyor belt and are not ordinarily visually discernible. In such counting aid of operation, a user puts a reference mark on the belt 3, enters by user command portion 25 a rezero command for an internal counter in the computer 26 to cause the display 27 to show a zero count value, as represented at 42, and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 43, for example by a conventional keyboard, as represented at 44, of the user command portion 25. The user would then enter a command to the computer 26 via the keyboard or other switch, for example, to cause the monitor system to commence operation in the programming mode to build the table of information on the distances between adjacent pairs of antennas. The use of the monitor system 1 as an event counting aid and the just described keyboard entry of events to the monitor system are, however, alternate embodiments to the best mode of the present invention.

In box 45 the automatic programming mode of the antenna locations and the building of the internal table during one belt cycle is presented. According to the best mode of the invention, a user may put a reference mark on the conveyor belt 3 at the rip detect station 11 and enter a start programming command, represented at 46, to start the conveyor belt sytem to build up the table of relative distance information. When the reference mark returns to the rip detector station 11, the user may enter a start rip detect command signal, represented at 47, for example by a further switch that delivers an appropriate signal to the computer 26, to cause the monitor system 1 automatically to observe the condition of the belt 3 to sense a rip therein. Such rip detect mode of operation is represented at box 48.

As an alternate embodiment to the best mode of the present invention, the computer 26 may be programmed to cause the monitor system 1 automatically to enter the rip detect mode. In this alternate embodiment, the number of antennas would have to be entered, box 43, as aforesaid. The monitor system, then, would automatically build the table of information for that number of antennas; upon completion of the table, the monitor system 1 automatically would enter the rip detect mode, box 48.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching, and the like of the conveyor belt during its operation and life expectancy, as well as other similar inaccuracies in the actual position of respective antennas, a window or error is permitted preferably on both sides of the anticipated position of each antenna. Therefore, the monitor system 1 will look for an antenna slightly before its expected arrival at the rip detector station 11 and for a brief period after the expected arrival; if no antenna is detected within the permitted window, the monitor system 1 promptly stops the conveyor belt system 2, as shown at box 49. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 50, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 51, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 52 in FIG. 2, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 53, Moreover, the monitor system may be overridden manually by the user, box 54, to continue operation of the conveyor belt system 2 without rip detection by the monitor system 1. Ordinarily, such overriding would occur when it is believed that a failure has occurred in the monitor system 1 while the conveyor belt 3 remains intact.

The above-described components and their interrelationships correspond generally to those disclosed in U.S. patent application Ser. No. 960,424, now U.S. Pat. No. 4,228,513. The improvement in the detector-amplifier 32 in accordance with the present invention, however, now will be described in greater detail. For purposes of the following discussion, such detector-amplifier 32 includes an input terminal 60 at which a pulse modulated 200 KHz signal is received from the detector plate 11 each time an antenna 10 passes the same, and a signal control circuit apparatus 61. Such signal is considered pulse modulated because it increases and decreases magnitude as the antenna approaches and leaves the detector station 11; usually no signal at the desired 200 KHz frequency will be received by the receiver plate 13 when no antenna is proximate the same. The input signal also may vary, for example in magnitude, in an irregular, unknown, or unpredictable manner, as dirt accumulates on the transducer or detector plates 11, 13, as the conveyor belt 3 stretches or contracts, as antennas 10 fatigue, etc. The circuit 61 includes an input circuit 62 which receives the event or input signal information from the input terminal 60, a changing means 63 which receives the input signal and produces an output signal at a predetermined magnitude in response to receipt of such input signal, and a control means 64 for controlling the changing means proportionally stepwise in response to the magnitude of at least one of the input and output signals. In the illustrated embodiment such control is effected in response to the magnitude of the output signal and, more particularly, in incremental steps the magnitude of which is proportional to the difference between the magnitude of the actual output signal and the predetermined or desired magnitude thereof. The apparatus 61 also includes an output bus 65, which corresponds to the connection 34 of FIG. 1, to couple the output signal to the computer 26 for the above described purposes.

In the input circuit 62 a capacitor 70 provides a DC signal blocking function in conventional manner and delivers the 200 KHz input signal to a first amplifier stage 71 comprised of a conventional integrated circuit amplifier 72 with a rectifier high signal protection circuit 73 coupled across the inverting and non-inverting inputs and a feed-back resistor 74 coupled across the output and inverting input. The amplifier stage 71 may be considered a preamplifier stage for signal amplification, signal isolation, impedance provision, etc. purposes. Ordinarily the diodes in the rectifier circuit 73 will not conduct but simply provide protection in the event of receipt of a high amperage signal caused, for example, by a lightning strike. Terminals 75 are provided for connecting there a further resistor to change the gain of the amplifier stage 71.

The amplified AC signal from the amplifier stage 71 is delivered to a tank circuit filter 76, which is tuned to the frequency of the signal received at the input terminal 60—in this case 200 KHz. The filtered signal then is passed via a DC blocking capacitor 78 to a further amplifier stage 80, which includes a conventional integrated circuit amplifier 81 and a resistor 82 and gain adjusting potentiometer 83 feed-back circuit. The further amplifier stage 80 provides at its output 84 periodically the relatively accurately filtered and amplified input signal.

Moreover, the input circuit 62 includes a half-wave rectifying and smoothing circuit 85 intended to deliver to the changing means 63 a DC pulse signal each time the 200 KHz event signal is received at the input terminal 60. Accordingly, the circuit 85 includes a diode rectifier 86, resistor 87 and smoothing capacitor 88. A further DC signal blocking capacitor 90 allows through to the changing means 63 as an input signal thereto the DC pulse signal at terminal 91 when a control switch 92 is closed. If desired, a 200 KHz test pulse signal may be delivered to the input circuit 62 at an input terminal 93 to test the operation of the signal control apparatus 61 and the circuitry, e.g. the computer 26 and associated parts, downstream thereof.

The changing means 63 includes an amplifier 94 with a variable gain. The amplifier 94 may be a conventional integrated circuit amplifier having coupled across the input terminals thereof a conventional DC blocking capacitor 95 that avoids offset problems and a protective diode 96. The variable gain for the amplifier 94 is provided by a stepwise adjustable impedance device 97, which may be considered part of the changing means 63 or of the control means 64 and in either event is directly associated with both. In accordance with the preferred embodiment and best mode of the present invention, the adjustable impedance device 97 may be an Analog Devices integrated circuit Model No. AD7523.

More particularly, the adjustable impedance 97 is a circuit that provides different magnitude resistors coupled in the feed-back circuit 98 with feed-back resistor 99 of the amplifier 94. Such impedance device 97 may be of the type known as an R2R ladder network. The adjustable impedance device 97 has an input bus 100 comprised of eight lines capable of receiving from the computer 26 or other means a parallel digital signal to provide in the feed-back circuit 98 up to 256 different impedance values. A change in the impedance digital control signal received on the input bus 100 may substantially instantaneously cause a small change in the impedance in the feed-back circuit 98 or a large change therein, thus effecting a corresponding change in the effective gain of the amplifier 94. Thus, an incremental or stepwise change in the gain of the amplifier 94 can be effected promptly in response to a change in the impedance digital control signal on the input bus 100 and the magnitude of such stepwise change will be proportional to the change in the impedance digital control signal.

On the output 101 of the amplifier 94 will be produced periodically then, as input signals are received at the input terminal 60, a DC pulse signal generally indicated at 102 having a magnitude that is a function of the magnitude of the signal received at terminal 91 and the gain of the amplifier 94. As will be described further below, the control means 64 in association with the computer 26 monitors the magnitude of the output signal 102 and appropriately adjusts the impedance digital control signal on the input bus 100 to maintain the magnitude of signal 102 at a predetermined value, which may be a specific value or a range of values or magnitudes.

A further filter 103 filters the DC pulse output signal 102 and such filtered output signal is provided via line 104 to a solid state analog to digital converter circuit 105, such as a Model No. LM3914. The analog to digital (A/D) converter converts the DC pulse signal to a parallel digital output signal on the output bus 65. In accordance with the preferred embodiment and best mode of the present invention, such analog to digital conversion is substantially linear, although, if desired, such conversion may be logarithmic or may be another non-linear function. Furthermore, in accordance with the preferred embodiment and best mode of the invention, the information provided on the output bus 65 will not be in the form of a binary number; rather, the number of lines 65a–65h on which a logic zero signal is provided will represent proportionally the magnitude of the DC pulse 102. For example, a logic one on all of lines 65a–65h represents minimum or zero magnitude of the DC pulse 102; a logic zero only on line 65a, with logic ones on the remaining lines of the output bus 65, indicates that the DC pulse magnitude is at least above a first magnitude; logic zeros on lines 65a and 65b indicates that the DC pulse exceeds at least a second magnitude; and so on; with a logic zero on all of lines 65a–65h indicating a maximum expected value of the DC pulse 102.

A resistance network 110 coupled to a positive voltage source 111 assures that the various lines of the output bus 65 are at logic one levels unless drawn down to logic zero levels by the A/D converter 105, the latter of which is connected to ground as shown.

The computer 26 periodically reads the output bus 65 under control of the computer program information in the computer and utilizes the information from the output bus 65, on the one hand, to develop an impedance digital control signal for delivery to the input bus 100, thereby to maintain the magnitude of the DC pulse signal 102 at least approximately at a predetermined magnitude or, in any event, to strive to do so when possible; and, on the other hand, to provide an indication that an antenna has become positioned at a rip detector station 11. If desired, the computer 26 may read the DC pulse signal 102 at the test point 102a directly or via other interface circuitry, not shown.

Also associated with the signal control apparatus 61 is a display means 112, the purpose of which is to display visually the general operational integrity of the monitor system 1, specifically the operational integrity of the detector amplifier 32, and most specifically the actual magnitude of the periodically occurring DC pulse signals. More particularly, the display means 112 includes a bank of light emitting diodes 113, the first two 113a, 113b of which are connected directly to the A/D converter 105, for example, to indicate by illuminating or non-illuminating of such diodes the operational integrity of the A/D converter and/or of a power supply for the latter and/or for the display means 112. Moreover, the diodes 113c–113j are connected by various resistors in a resistor network 114 to the respective lines 65a–65h of the output bus 65 and to a positive voltage source power supply 115. Thus, whenever a logic one signal occurs on a line of the output bus 65, the corresponding diode will be extinguished; whereas whenever logic zero appears on a line in the output bus 65, the corresponding diode will be illuminated. Accordingly, the number of diodes (or other means for providing a visual output upon energization or de-energization) illuminated will represent the magnitude of the DC pulse signal 102.

Figure 5:
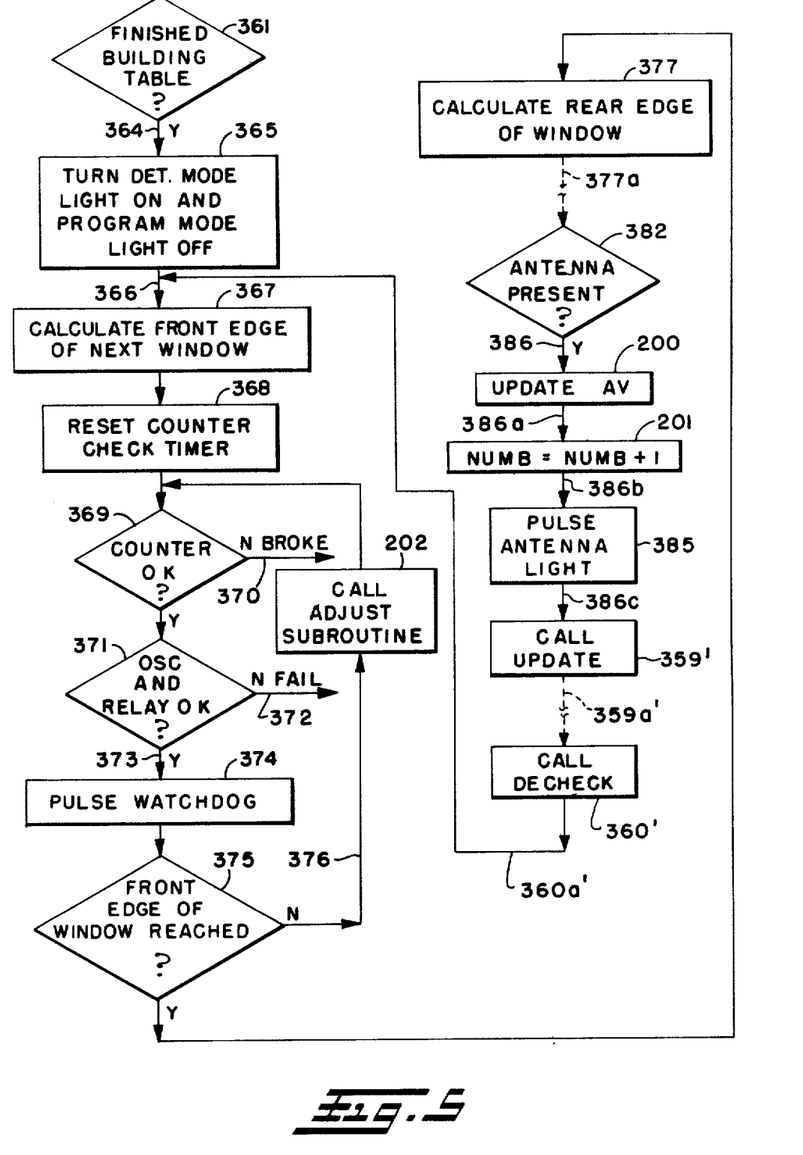
FIG. 5 is a partial representative flow chart of procedures and steps followed in operation of the monitor system in accordance with the method of the invention, the procedures and steps illustrated in FIG. 5 and designated by a reference numeral exceeding 300 corresponding to those of the same number disclosed in U.S. patent application Ser. No. 960,424, now U.S. Pat. No. 4,228,513, as modified in accordance with the present invention described in detail below.

Turning now briefly to FIG. 5, a partial compilation of the computer program flow chart disclosed in U.S. patent application Ser. No. 960,424, now U.S. Pat. No. 4,228,513, is presented. The following brief description concerning FIG. 5 summarizes the more comprehensive disclosure, particularly relating to FIGS. 10C and 10D of such copending application.

After the table of information concerning the relative locations of the antennas 10 in the belt 3 has been completed at block 361, following line 364 to block 365 the detect mode light and program mode light, which are not shown here, are turned on and off, respectively. Following line 366 to block 367 the front edge of the next window is calculated and then a sub-routine of reset counter check timer is called in block 368. Thereafter a check is made of the operation of the counter, oscillator and relay at blocks 369 and 371; if there is a problem the system enters a failure mode via line 370 or 372; if these are properly operational, the watchdog timer is pulsed at block 374 and then inquiry is made at block 375 whether the front edge of the window has been reached.

When the front edge of the window, i.e. the expected area along the belt within which the next antenna is expected to be found, has been reached as detected at block 375, the rear edge of the window is calculated at block 377. Several additional steps may occur following the calculation in block 377, as is represented by the broken interrupted line at 377a; ultimately at block 382 an inquiry is made to detect whether an antenna is present. When the antenna is present at the rip detector station 11 causing a DC pulse 102 to be produced in the signal control apparatus 61 of the detector amplifier 32, the program follows line 386 shown in FIG. 5. Skipping briefly to block 385, the antenna light (not shown) is pulsed to indicate that an antenna has been detected, and following the portion 386c of line 386 an UPDATE sub-routine is called at block 359', such sub-routine being described in detail in the copending application. Following line 359a', which is broken and interrupted indicating that several steps may occur there, as is described in the copending application particularly with reference to FIG. 10C, a sub-routine DECHECK, which is described in the copending application, is called at block 360'. After completing the DECHECK sub-routine, line 360a' is followed back to line 366, whereupon the front edge of the next window is calculated to commence an operation looking for detection of the next antenna along the belt.

The foregoing briefly summarizes relevant portions of the method of operation and computer program flow chart disclosed in the copending application to facilitate comprehension of the manner in which several improvements of the present application are interrelated therewith.

In particular, at block 200 in FIG. 5, which occurs just after the detection of an antenna has occurred at block 382, a variable "AV" is updated. The variable AV is the summation of the number of lights 113c–113j that have been illuminated to that point or time since the last adjustment of gain had been made in the signal control apparatus 61 based, for example, on the peak value of each DC pulse 102 having occurred. In the preferred embodiment and best mode of the invention, such gain adjustment ordinarily will occur only after several antennas have been detected by the monitor system 1 in order to average out the values of the DC pulses 102. Therefore, in block 200 each time a DC pulse 102 has been produced the computer 26 preferably reads the magnitude, in the preferred embodiment the number of lines that are at logic zero level, of the signal on the output bus 65 and increments the variable AV by that amount.

Moreover, in block 201 of FIG. 5, which follows block 200 via line 386a, a further variable NUMB is incremented by one. The variable NUMB is a counter of the number of antennas that have been detected up to that point in operation of the monitor system 1 since the last adjustment of gain had been made in the signal control apparatus 61 (FIG. 3). The variable NUMB is used in the ADJUST sub-routine of block 202 for the purpose of allowing the latter to effect operation of the computer 26 to cause operation of the signal control apparatus 61 to make an appropriate gain adjustment.

From block 201 the flow chart follows line 386b to block 385 for pulsing of the antenna light, as was described above.

It will be seen that the ADJUST sub-routine of block 202 is called only before the front edge of a window has been reached, which is sensed at block 375. Therefore, adjusting of the gain in the signal control apparatus 61 may not occur while the monitor system 1 is searching for the next antenna within a window.

Figure 4:
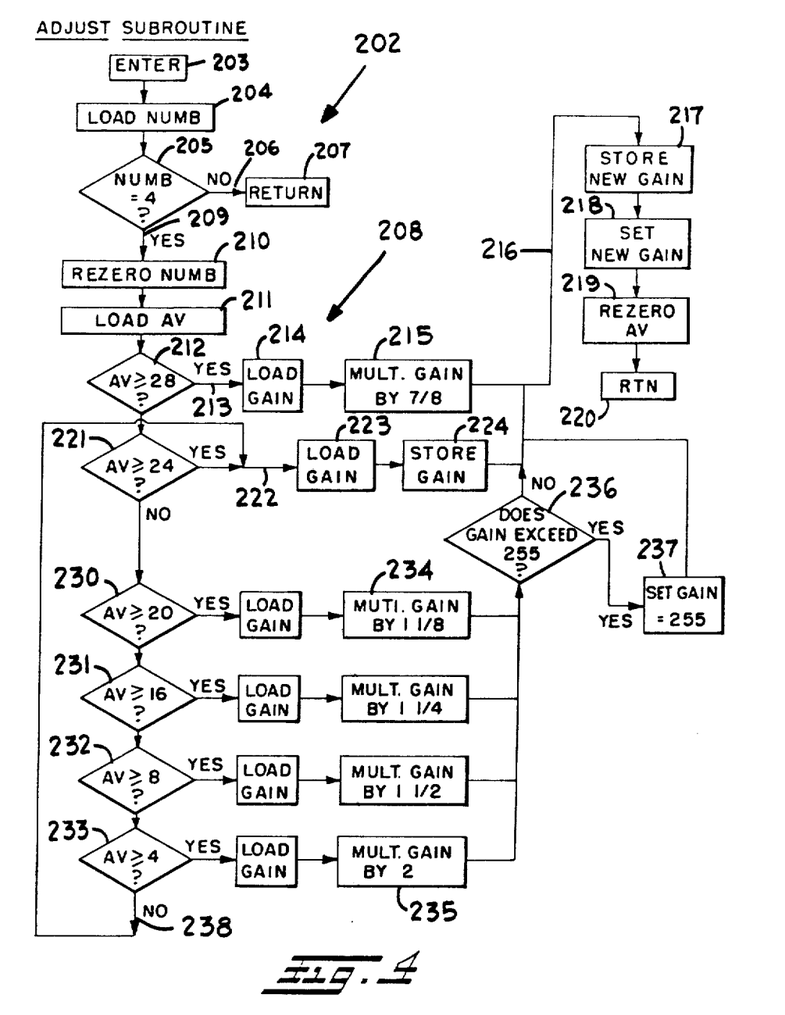
FIG. 4 illustrates a representative flow chart of procedures and steps followed in operation of the signal control circuit apparatus in cooperation with the overall monitor system.

Referring now in detail to FIG. 4, the ADJUST sub-routine 202 is shown. Such ADJUST sub-routine is entered at block 203 via line 376 (FIG. 5) when the front edge of the window has not yet been reached as sensed at block 375 (FIG. 5). At block 204 the value of the variable NUMB is loaded into the accumulator of the computer 26 and an inquiry is made at block 205 whether the value of NUMB equals four; if not, line 206 is followed to a return 207 leading back via line 376 (FIG. 5) to block 369 (FIG. 5), thus causing the flow chart to enter a loop until such time as a problem is detected at blocks 369 or 371 or the front edge of the window has been reached at block 375.

When the value of the variable NUMB equals its consent value, four in the case of the preferred embodiment, the ADJUST sub-routine 202 enters the gain adjusting portion 208 thereof. It will be appreciated that the consent value may be one if it is desired to adjust the gain in the signal control apparatus 61 after each antenna has been detected. Alternatively the consent value may be as great as the total number of antennas in the belt 3, whereby a gain adjustment will occur only after each complete cycle of the belt, or greater.

When the value of NUMB 205 reaches its consent value, four in this case, line 209 is followed to block 210, whereupon the variable NUMB is rezeroed. At block 211, then, the present value of the variable AV is loaded into the accumulator of the computer 26.

In the preferred embodiment it is desired to have the magnitude of the DC pulse 102 be within a predetermined range of values such that upon occurrence of each DC pulse usually six or seven of the lights or photo diodes 113c–113j will be illuminated at the peak of the respective DC pulse. Of course, if desired, other peak magnitudes of absolute predetermined value or a range of predetermined values may be selected.

Accordingly, at block 212 the value of AV, which is a summation of the number of lights 113c–113j having been lit at the peak of the preceding four DC pulses when the preceding four antennas had been detected, is checked. If the value is greater or equal to 28, which is slightly higher than desired, line 213 is followed to block 214, whereupon a value representing the actual gain of the amplifier 94 (FIG. 3) is loaded into the accumulator of computer 26. At block 215 the value of the gain stored in the computer is reduced by multiplying the same by a fractional amount, in this case the value $\frac{7}{8}$. Thereafter line 216 is followed to cause the new gain to be stored in the memory of the computer 26 at block 217 and the computer 26 sets the new gain in the signal control apparatus 61 by delivering an appropriate impedance digital control signal to the input bus 100 of the adjustable impedance 97 (FIG. 3) at block 218. The variable AV is rezeroed at block 219, and the ADJUST sub-routine then returns via block 220 and the portion 376a of line 376 to block 369 of the flow chart illustrated in FIG. 5.

Stepping back to block 212, if the value of the variable AV is less than 28, block 221 is entered to inquire whether the value of AV is equal to or greater than 24. In the preferred embodiment it is most preferred that the value AV be from 24 through 27, for it will be seen that no change is made then to the gain of amplifier 94 (FIG. 3). Accordingly, if block 221 is satisfied affirmatively, line 222 is followed causing the gain to be loaded at block 223 into the accumulator of computer 26 and then stored in the computer memory at block 224. Following line 216 the new gain, which is the same as the prior gain, is stored at block 277; the new gain is set by delivery of an impedance digital control signal on the input bus 100 (FIG. 3) at block 218; AV is rezeroed at block 219, and the flow chart returns via block 220 and line 376a to block 369 of FIG. 5, as aforesaid.

At blocks 230–233 inquiries are made to learn whether the value of AV is from 4 through 23; if affirmative, the appropriate gain adjustment is made, in the same manner described above by loading a signal representing the actual gain into the computer accumulator and multiplying the gain by a value greater than one. Such multiplier will be inversely proportional to the actual average of the DC pulse values. Thus, when AV is fairly large, the multiplier will be 1$\frac{1}{8}$; however, when AV is fairly small, representing a relatively small DC pulse magnitude, the multiplier will be relatively large, say 2, as are represented, respectively, at blocks 234, 235.

If such multiplication causes the gain to exceed a predetermined maximum value, an inquiry about which is made at block 236, then at block 237 the gain stored in the accumulator is set back down to the maximum desired value. Thereafter, following line 216 the new gain, i.e. the maximum allowed value, is stored, etc., as aforesaid. As is seen in block 236, the maximum gain value is 255; such value need not be the actual gain value but rather a proportional representation thereof. In fact, the value 255 shown in block 236 represents the decimal numerical value of the largest binary number that can be entered as an impedance digital control signal on the input bus 100 to the adjustable impedance 97 (FIG. 3). The maximum value in block 236 may be greater than that shown if the capacity or capability of input information to the adjustable impedance 97 is greater than the element shown in the preferred embodiment of the invention; likewise, the value in block 236 and in block 237 may be lowered, as desired.

At block 233 it may be found that the value of AV is below a minimum value of in the preferred embodiment four, whereupon the flow chart follows line 238 back to line 222. This is an unusual condition and may be caused, for example, by several marginal antennas having just been sensed in the belt 3. A marginal antenna is one that may be nearly broken or actually broken with adjacent ends barely touching so that any signal coupled therethrough is substantially attenuated. Of course, if the magnitude of the DC pulse 102 produced by such series of marginal antennas is so small, it is likely that on the next occurrence of at least one of them at the rip detector station 11, the monitor system may shut down the conveyor belt or take other appropriate steps.

Therefore, when the value of AV is less than four, following line 238 to line 222 the gain is not changed. Rather, the former gain is loaded into the accumulator at block 223 and is stored in memory at block 224, and so on, as was described above.

After the ADJUST sub-routine has been completed and return via block 220 is effected, the flow chart of FIG. 5 will be followed until the next gain adjustment is permitted according to the consent value of the variable NUMB at block 205.

In view of the foregoing it will be appreciated that the invention provides a means for controlling the signal particularly by changing the gain and preferably that gain is varied in increments or steps that are proportional to the magnitude of the output signal (DC pulse) by itself or the difference of it and a predetermined magnitude. The size of the increments are digitally controlled using the adjustable impedance 97 and the size of the increments are determined by the multiplier described above with reference to FIG. 4. The signal control apparatus may be used in the preferred embodiment in connection with a monitor system 1 for a conveyor belt system 2.

As used in the above description the reference to proportional stepwise control of the amplifier 94 or changing means 63 means the digital control thereof and/or the effect of controlling the same by a proportional amount that varies according to the magnitude of the signal in issue, e.g. the output signal (DC pulse), or the difference between such magnitude and a predetermined magnitude.

Moreover, it will be appreciated that the above described computer program flow charts may be converted by a person having ordinary skill in the art to computer program language, machine language, etc., capable of effecting control of a conventional computer 26.

The above described apparatus and operational steps thereof may be used to practice the method of the invention. For example, in accordance with the method a signal is controlled by providing an input signal, say to the amplifier 94, amplifying such input signal to produce an output signal at a predetermined magnitude, and controlling the amplifying step proportionally stepwise in response to the magnitude of either the input or the output signal. Such method may be employed in connection with the automatic monitoring of a plurality of events in a cyclical process, such as the movement of a conveyor belt, by storing information concerning the expected position of each event in the process, the detecting of each event in the process and producing a signal representing the same, the controlling of that signal so that it is desirably at a predetermined magnitude using the above technique, simultaneously detecting the progress of the process, and sensing whether respective events occur at expected positions in the progress of the process.

STATEMENT OF INDUSTRIAL APPLICATION

In view of the foregoing it will be appreciated that the subject invention may be employed for signal control purposes, for process monitoring purposes, and particularly for improved conveyor belt rip detector purposes.

I claim:

1. A monitoring apparatus for monitoring the occurrence of a plurality of events in a cyclical process, comprising event transducer means for detecting the occurrence of such events in such process, said event transducer means comprising means for producing an input signal which may vary in an unknown manner upon the occurrence of each event, a signal control apparatus including output means for producing an output signal, changing means for receiving such input signal and causing said output means to produce such output signal at a predetermined magnitude in response to receipt of such input signal, and control means for controlling said changing means in discrete steps that are, respectively, proportional to the magnitude of at least one of such input and output signals, progress transducer means for detecting the progress of such process, and search means for sensing whether respective events occur at expected positions in the progress of such process.

2. The apparatus of claim 1, said input means comprising amplifier means for amplifying such input signal, such input signal comprising a pulse signal, and said input means further comprising means for filtering such pulse signal and delivering the same to said changing means.

3. The apparatus of claim 1, said input means comprising means for receiving a pulse modulated AC signal, filter means for filtering such pulse modulated AC signal to produce therefrom a DC pulse signal as such input signal, said output means comprising means for producing such output signal as an output DC pulse signal, and said changing means and control means being cooperative to strive to maintain the maximum amplitude of such output DC pulse signal at such predetermined magnitude.

4. The apparatus of claim 3, such predetermined magnitude comprising a range of magnitudes between minimum and maximum magnitudes.

5. The apparatus of claim 1, said changing means comprising means for amplifying such input signal to produce such output signal and means for changing the proportional relation between such input and output signals in incremental steps of different magnitude.

6. The apparatus of claim 5, said means for changing comprising a digitally responsive device, and said control means comprising means for delivering parallel digital information to said digitally responsive device substantially instantaneously to effect such stepwise changing.

7. The apparatus of claim 6, said means for amplifying comprising an amplifier and said digitally responsive device comprising a resistance ladder network for changing the gain of said amplifier.

8. The apparatus of claim 6, said control means comprising analog to digital converter means for producing output digital information proportionally representative of the magnitude of such output signal and computer means for monitoring the magnitude of such output digital information and in response thereto to deliver digital information to said digitally responsive device.

9. The apparatus of claim 6, said control means comprising analog to digital converter means for producing parallel digital output information proportionally representative of the magnitude of such output signal, and further comprising display means for visually displaying the value of such parallel digital output information, said display means comprising a plurality of light output means coupled to have a number of the same energized to deliver a visual output in response to respective logic levels of the signal comprising such parallel digital output information.

10. The apparatus of claim 1, said changing means comprising an amplifier and said control means comprising means for changing the gain of said amplifier.

11. A monitoring apparatus for monitoring the occurrence of a plurality of events in a cyclical process, comprising event transducer means for detecting the occurrence of such events in such process, said event transducer means comprising means for producing an input signal which may vary in an unknown manner upon the occurrence of each event, a signal control apparatus including output means for producing an output signal, changing means for receiving such input signal and causing said output means to produce such output signal at a predetermined magnitude in response to receipt of such input signal, and control means for controlling said changing means in discrete steps that are, respectively, proportional to the magnitude of at least one of such input and output signals, progress transducer means for detecting the progress of such process, start-stop control means for starting and stopping such process, and computer means for sensing whether respective events occur at expected positions in the progress of such process, said computer means being coupled to said start-stop control means to operate the same to stop such process when a prescribed number of events has been missed.

12. The apparatus of claim 1 or 11, said event transducer means comprising means for producing an event electrical signal upon the occurrence of each event, and said signal control apparatus comprising detector circuit means for detecting such event electrical signals and gain control circuit means for striving maintain the magnitude of at least one of such event electrical signals and signals representative of the occurrence thereof at a predetermined magnitude.

13. The apparatus of claims 1 or 11, said event transducer means comprising conveyor belt rip detector means for monitoring the integrity of a conveyor and such process comprising cyclical operation of such conveyor, said rip detector means comprising a transmitter and a receiver, and signal coupling means associated with such conveyor for periodically, according to the progress of such conveyor, coupling a signal from said transmitter to said receiver, as an indication of such event and, thus, of such integrity, said signal control apparatus being coupled to said receiver to strive to maintain the output thereof, as represented by such output signal, at such predetermined magnitude as the signal coupling efficiency of said signal coupling means varies.

14. The apparatus of claims 1 or 11, said predetermined magnitude comprising a range of magnitudes and said control means comprising means for controlling said changing means in steps that are proportional, respectively, to the difference in magnitude between magnitudes in such range and the magnitude of at least one of such input and output signals.

15. The apparatus of claims 1 or 11, said output means comprising an amplifier and said changing means comprising means for changing the gain of said amplifier.

16. The apparatus of claim 15, further comprising display means for displaying the magnitude of such output signal.

17. The apparatus of claim 15, said output means further comprising analog to digital converter means for converting the output from said amplifier to a digital signal representative of the magnitude thereof.

18. The apparatus of claims 1 or 11, said control means comprising means for controlling in response to the difference between such predetermined magnitude and the magnitude of at least one of such input and output signals.

19. The apparatus of claims 1 or 11, said changing means comprising means for amplifying such input signal to produce such output signal, means for changing the proportional relation between such input and output signals in incremental steps of different magnitude, and a digitally responsive device, and said control means comprising means for delivering parallel digital information to said digitally responsive device substantially instantaneously to effect such stepwise changing.

20. The apparatus of claim 19, said control means comprising analog to digital converter means for producing parallel digital output information proportionally representative of the magnitude of such output signal, and further comprising display means for visually displaying the value of such parallel digital output information, said display means comprising a plurality of light output means coupled to have a number of the same energized to deliver a visual output in response to respective logic levels of the signal comprising such parallel digital output information.

21. A method for automatically monitoring the ocurrence of a plurality of events in a cyclical process, comprising storing information concerning the expected position of each event in such process, detecting the occurrence of such events in such process and producing an input signal which may vary in an unknown manner upon such occurrence, controlling such input signal by amplifying such input signal to produce an output signal at a predetermined magnitude and controlling said amplifying in discrete steps that are, respectively, proportional to the magnitude of at least one of such input and output signals, simultaneously detecting the progress of such process, and sensing whether respective events occur, as represented by the occurrence of such an output signal, at expected positions in the progress of such process.

22. The method of claim 21, said amplifying comprising using an amplifier to amplify such input signal to produce such output signal, and said controlling comprising controlling the gain of said amplifier.

23. The method of claim 22, said controlling the gain comprising changing the gain in incremental steps of different magnitude in dependence on the magnitude of at least one of such input and output signals.

24. The method of claim 23, said controlling the gain comprising changing the gain in incremental steps of different magnitude in dependence on the difference between such predetermined magnitude and the magnitude at least one of such input and output signals.

25. The method of claim 22, further comprising sensing whether the magnitude of such output signal is beyond a predetermined magnitude and when the same is affirmatively sensed at least temporarily preventing any change in such gain.

26. The method of claim 25, wherein said sensing whether the magnitude of such output signal is beyond a predetermined magnitude comprises sensing whether such output signal is less than a minimum value.

27. The method of claim 22, further comprising limiting the maximum gain of such amplifier.

28. The method of claim 22, said controlling the gain comprising reducing such gain when the magnitude of such output signal exceeds a predetermined value.

29. The method of claim 22, said controlling the gain comprising maintaining substantially constant such gain when the magnitude of such output signal is within a predetermined desired range.

30. The method of claim 22, further comprising displaying the value of such output signal.

31. The method of claim 22, wherein such input signal comprises a pulse modulated AC signal, and further comprising operating on such pulse modulated AC signal to produce a DC pulse signal, and said amplifying comprising amplifying such DC pulse signal to produce such output signal as a DC pulse.

32. The method of claim 22, said controlling comprising controlling the gain in response to the difference in magnitude between such predetermined magnitude and the magnitude of at least one of such input and output signals.

33. The method of claim 21, wherein such process is the operation of an endless type conveyor belt, said step of detecting the occurrence comprises checking specified portions of such conveyor belt as they pass a rip detector station to find a rip in the conveyor belt whereby an undetected event at its expected position during said sensing step may be interpreted as a rip in the conveyor belt, said checking comprises coupling a signal from a transmitter to a receiver each time an event occurs to produce such input signal, and said controlling comprising controlling to maintain the magnitude of such output signal at approximately such predetermined magnitude as the efficiency of such coupling and, therefore, the magnitude of such input signal varies.

34. A signal control apparatus, comprising input means for receiving an input signal, output means for producing an output signal, changing means for receiving such input signal and causing said output means to produce such output signal at a predetermined magnitude in response to receipt of such input signal, and control means for controlling said changing means in steps that are proportional, respectively, to the magnitude of at least one of such input and output signals, said control means comprising means for controlling in response to the difference between such predetermined magnitude and the magnitude of such output signal as represented by an aveage value thereof.

35. A monitoring apparatus for monitoring the occurrence of a plurality of events in a cyclical process, comprising event transducer means for detecting the occurrence of such events in such process, said event transducer means comprising means for producing an input signal upon the occurrence of each event, a signal control apparatus including output means for producing an output signal, changing means for receiving such input signal and causing said output means to produce such output signal at a predetermined magnitude in response to receipt of such input signal, and control means for controlling said changing means in steps that are proportional, respectively, to the magnitude of at least one of such input and output signals, progress transducer means for detecting the progress of such process, and search means for sensing whether respective events occur at expected positions in the progress of such process, said control means comprising means for controlling in response to the difference between such predetermined magnitude and the magnitude of at least one of such input and output signals, said control means comprising means for controlling in response to the magnitude of such output signal as represented by an average value thereof.

36. A monitoring apparatus for monitoring the occurrence of a plurality of events in a cyclical process, comprising event transducer means for detecting the occurrence of such events in such process, said event transducer means comprising means for producing an input signal upon the occurrence of each event, a signal control apparatus including output means for producing an output signal, changing means for receiving such input signal and causing said output means to produce such output signal at a predetermined magnitude in response to receipt of such input signal, and control means for controlling said changing means in steps that are proportional, respectively, to the magnitude of at least one of such input and output signals, progress transducer means for detecting the progress of such process, start-stop control means for starting and stopping such process, and computer means for sensing whether respective events occur at expected positions in the progress of such process, said computer means being coupled to said start-stop control means to operate the same to stop such process when a prescribed number of events has been missed, said control means comprising means for controlling in response to the difference between such predetermined magnitude and the magnitude of at least one of such input and output signals, said control means comprising means for controlling in response to the magnitude of such output signal as represented by an average value thereof.

37. A method for controlling a signal, comprising providing an input signal, amplifying such input signal to produce an output signal at a predetermined magnitude, and controlling said amplifying step in steps that are proportional, respectively, to the magnitude of at least one of such input and output signals, said amplifying comprising using an amplifier to amplify such input signal to produce such output signal, and said controlling comprising controlling the gain of said amplifier, said controlling the gain comprising changing the gain in incremental steps of different magnitude in dependence of the difference between such predetermined magnitude and the magnitude of at least one of such input and output signals, and wherein said controlling the gain comprises increasing such gain in a single step by from about $12\frac{1}{2}\%$ to about 100% in dependence on such difference when the magnitude of such output signal is within a predetermined range of values.

38. A method for automatically monitoring the occurrence of a plurality of events in a cyclical process, comprising storing information concerning the expected position of each event in such process, detecting the occurrence of such events in such process and producing an input signal upon such occurrence, controlling such input signal by amplifying such input signal to produce an output signal at a predetermined magnitude and controlling said amplifying in steps that are proportional, respectively, to the magnitude of at least one of such input and output signals, simultaneously detecting the progress of such process, and sensing whether respective events occur, as represented by the occurrence of such an output signal, at expected positions in the progress of such process, said amplifying comprising using an amplifier to amplify such input signal to produce such output signal, and said controlling comprising controlling the gain of said amplifier, said controlling the gain comprising changing the gain in incremental steps of different magnitude in dependence on the difference between such predetermined magnitude and the magnitude of at least one of such input and output signals, and wherein said controlling the gain comprises increasing such gain in a single step by from about $12\frac{1}{2}\%$ to about 100% in dependence on such difference when the magnitude of such output signal is within a predetermined range of values.

39. A method for controlling a signal, comprising providing an input signal, amplifying such input signal to produce an output signal at a predetermined magnitude, and controlling said amplifying step in steps that are proportional, respectively, to the magnitude of at least one of such input and output signals, said amplifying comprising using an amplifier to amplify such input signal to produce such output signal, and said controlling comprising controlling the gain of said amplifier in response to an average of the magnitudes of a plurality of such output signals.

40. A method for automatically monitoring the occurrence of a plurality of events in a cyclical process, comprising storing information concerning the expected position of each event in such process, detecting the occurrence of such events in such process and producing an input signal upon such occurrence, controlling such input signal by amplifying such input signal to produce an output signal at a predetermined magnitude and controlling said amplifying in steps that are proportional, respectively, to the magnitude of at least one such input and output signals, simultaneously detecting the progress of such process, and sensing whether respective events occur, as represented by the occurrence of such an output signal, at expected positions in the progress of such process, said amplifying comprising using an amplifier to amplify such input signal to produce such output signal, and said controlling comprising controlling the gain of said amplifier in response to an average of the magnitudes of a plurality of such output signals.

* * * * *